F. P. WELCH.
COLLAR AND METHOD OF MAKING THE SAME.
APPLICATION FILED MAY 16, 1918.
1,302,258.
Patented Apr. 29, 1919.
2 SHEETS—SHEET 1.
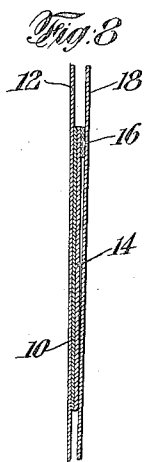
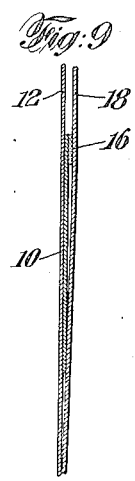
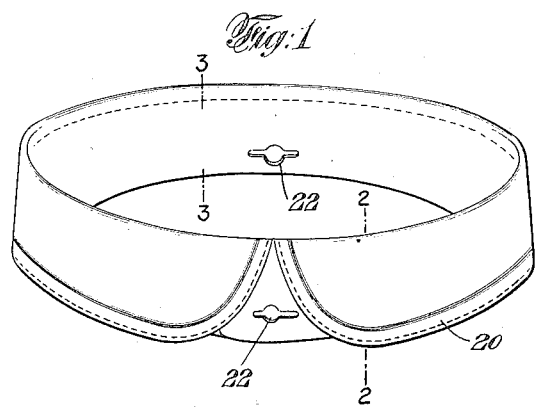
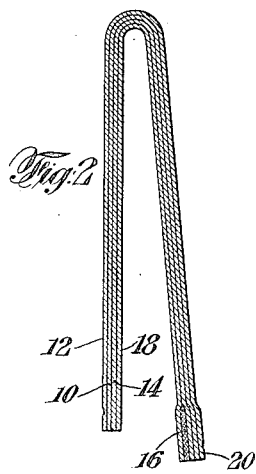
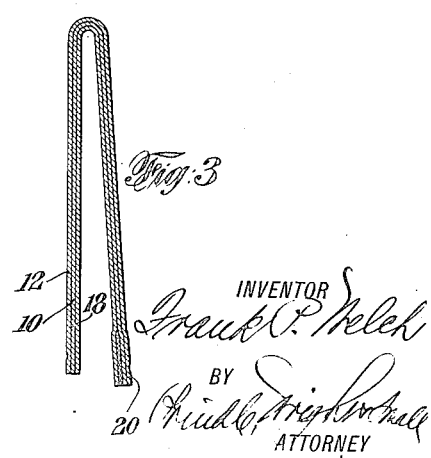
INVENTOR
Frank P. Welch
BY
ATTORNEY

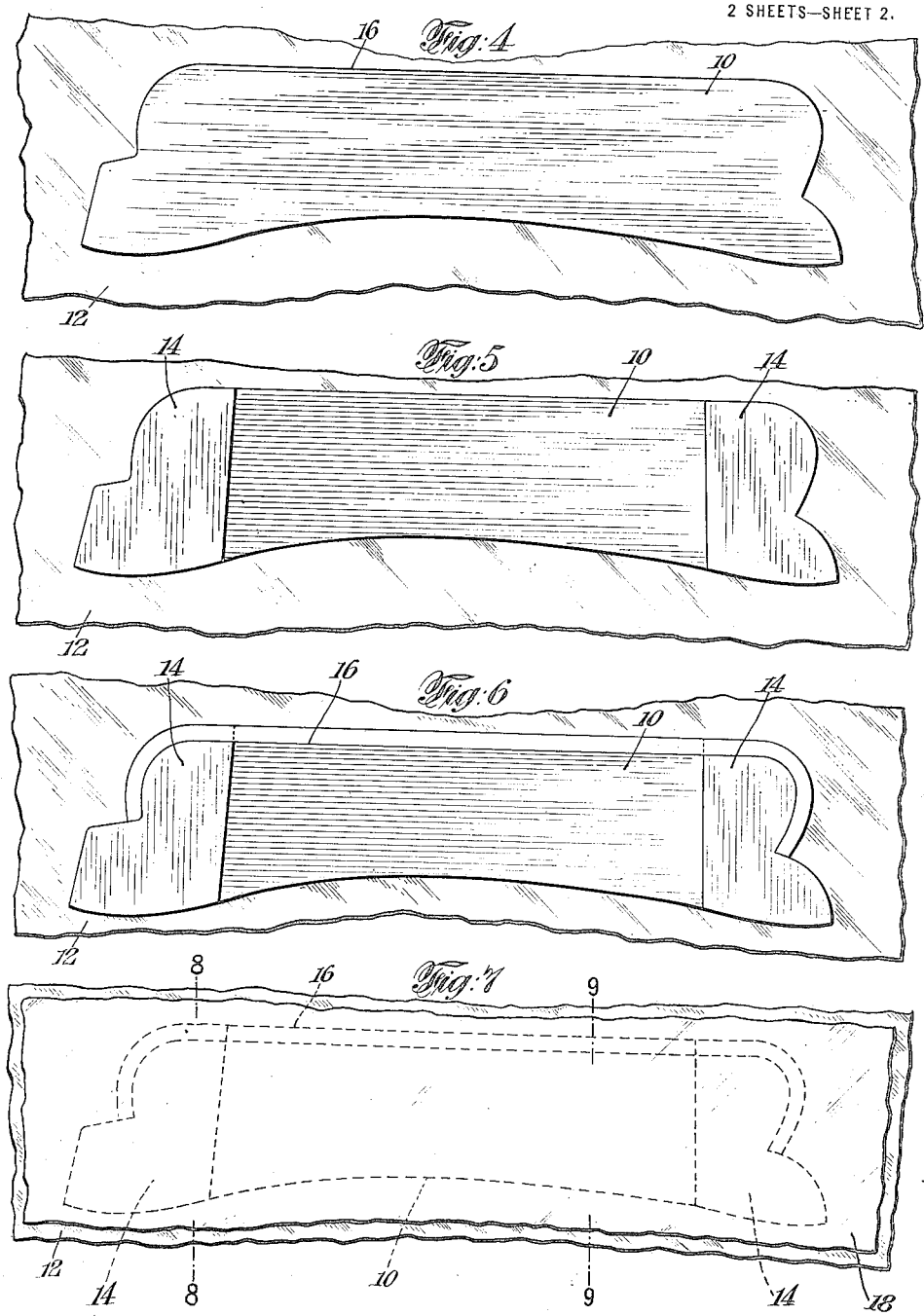

UNITED STATES PATENT OFFICE.

FRANK P. WELCH, OF POUGHKEEPSIE, NEW YORK, ASSIGNOR TO E. I. DU PONT DE NEMOURS & COMPANY, OF WILMINGTON, DELAWARE, A CORPORATION OF DELAWARE.

COLLAR AND METHOD OF MAKING THE SAME.

1,302,258.　　　　　Specification of Letters Patent.　　Patented Apr. 29, 1919.

Application filed May 16, 1918. Serial No. 234,841.

*To all whom it may concern:*

Be it known that I, FRANK P. WELCH, of Poughkeepsie, in the county of Dutchess, and in the State of New York, have invented a certain new and useful Improvement in Collars and Methods of Making the Same, and do hereby declare that the following is a full, clear, and exact description thereof.

This invention relates to collars and the method of making the same. More particularly the invention relates to an article of wearing apparel, a cleanable collar and the method by which said collar is made.

The pyroxylin collar ordinarily known as a "celluloid" collar has not been generally accepted by the public on account of several objectionable features. Among these features may be mentioned the liability of the celluloid collar to crack at the folding, at the end tabs and in the buttonholes. The ordinary celluloid collar is quite stiff and uncomfortable and the thin outer edge always serves to distinguish such a collar from the accepted linen collar.

The primary object of the present invention is to provide a method of making cleanable collars and the product thereof which will overcome the objectionable features above noted.

Another object of the invention is to provide an improved method of making a collar from a cellulose ester by which a large saving of the cellulose ester may be effected.

With this and other objects in view, the invention consists in the improved collar and method of making the same hereinafter described and claimed.

The various features of the invention are illustrated in the accompanying drawings, in which—

Figure 1 is a perspective view of a collar embodying the invention in its preferred form;

Figs. 2 and 3 are enlarged vertical sectional views of the collar taken on the lines 2—2 and 3—3 of Fig. 1;

Figs. 4, 5, 6 and 7 are diagrammatic views illustrating the method of assembling the cellulose ester sheets and reinforcing fabrics in making the improved collar; and Figs. 8 and 9 are vertical sectional views taken on the lines 8—8 and 9—9 of Fig. 7 illustrating the position of the assembled parts of the collar.

In the preferred form of the invention, blanks of fabric 10, usually muslin or linen, are died out to the shape of the finished collar, a separate die being used for each of the different styles and sizes of collars. The died-out blanks are secured in rows upon a relatively thin sheet 12 of a cellulose ester by means of a cellulose ester cement which consists of a cellulose ester dissolved in a volatile solvent. The fabric blanks are coated with the cement by dipping the blanks into the cement or by applying the cement to the blank with a brush, and the blanks are then secured on the cellulose ester sheet 12 in a smooth flat position as shown in Fig. 4. Fabric strengthening and toughening tabs 14 are then secured to the ends of the blanks 10 as shown in Fig. 5. The tabs consist of muslin or linen fabric which are died out to have the same shape as the ends of the blank and the grain of the fabric of the tabs is so arranged that the grains of the blank and tabs will be at an angle when the tabs are secured to the blank. The tabs are preferably coated with the cellulose ester cement to assist in securing them in position. Over the tabs and blanks 10 are secured narrow strips 16 of a relatively thick cellulose ester which are positioned to accurately conform with the outline of the outer edge of the blanks as shown in Fig. 6. The strips 16 are preferably held in position over the tabs 14 and blanks 10 by means of a cellulose ester cement. The row of blanks 10 having the tabs 14 and strips 16 thereon is then covered with a sheet of cellulose ester 18 as shown in Fig. 7. The cellulose ester sheets 12 and 18, with the blanks, tabs and strips between them, are then placed between pads of a pressing machine and are subjected to a high pressure while the pads are heated with steam. This treatment with pressure and heat serves to unite the sheets 12 and 18 with the blanks, tabs and strips to form a continuous integral sheet.

When the integral sheet and the fabric blanks therein are removed from the press the sheet is died out by means of a die having the same shape as a die used for making the fabric blanks. In dieing out the integral sheet, the sheet is so positioned with relation to the die, that the died-out portion will correspond to the shape of the fabric blank embedded in the integral sheet. To position the sheet with relation to the die the sheet may be placed between the die and a light and the light will show the position of the fabric blank embedded within the sheet. To more accurately position the sheet with relation to the die, however, advantage is taken of a rib 20 (see Figs. 1, 2, and 3) which is formed in the face of the sheet by means of the strip 16 when the integral sheet is formed in the mold. This rib is formed around the outer edge of the collar and serves as a convenient medium for positioning the die when cutting out the blank. Also the rib 20 in conjunction with a light may be used for positioning the integral sheet with relation to the die.

The blanks which have been died out of the integral sheet containing the fabric blanks are then molded and finished to form the finished collar. The molding generally consists in pressing the blank in a mold, the faces of which consist of linen, so that the collar will have a dull linen finish. The strip 16 embedded around the outer edge of the collar materially assists in giving a good finish to the visible edge of the collar. The finishing steps usually consist in placing buttonholes 22 in the ends and central portion of the collar and in folding and shaping the collar.

The collars formed by the method outlined above contain many advantageous features. The portion of the collar which is subjected to the greater strain while the collar is being worn is strengthened by means of two layers of fabric which have their grains arranged at an angle. The cellulose ester united with the two layers of fabric is comparatively thin so that the portion having the two layers of fabric is flexible and very tough. Further the buttonholes on the ends of the collar are formed in the portion which has two layers of fabric so that the buttonholes are not liable to break away. The major portion of the collar consists of one layer of fabric which is embedded between two sheets of pyroxylin, each sheet of which usually has a thickness of about .006 inch. With a reinforcing material having a thickness of .005 inch, the thickness of a collar at this portion is therefore less than .025 inch. This gives a thin structure which is pliable and flexible and will easily conform to the shape of the neck and is not sufficiently stiff to make the collar uncomfortable. The strip of cellulose ester around the outer edge of the collar usually has a thickness of .016 inch, and this thickness, when added to the thickness of the reinforcing fabric and sheets of cellulose ester at this portion of the collar, generally gives the outer edge of the collar a thickness greater than .035 inch. An edge with this thickness closely resembles the thickness of linen collar and still is not sufficiently great to detract from the flexibility of the collar.

The cellulose ester preferably used in making the collar is "pyralin" which consists of cellulose nitrate containing camphor and the usual solvent. In place of pyralin may be used other cellulose esters, such as cellulose acetate.

It will be noted that, in making collars according to the method outlined above, the only fabric employed is that fabric which remains in the finished collar. The waste cellulose ester material which remains after the collars are died out of the integral sheet consists of a pure cellulose ester which may be dissolved and used again in making new collars. This constitutes an important feature of my invention since, heretofore, the waste material from the manufacture of collars always contained reinforced fabric or other foreign material which left the scrap or waste material in such a condition that it could not be again used for making collars without an expensive reclaiming process.

The preferred form of the invention having been thus described, what is claimed as new is:

I claim:

1. The method of making a collar comprising, positioning a died-out fabric blank on a sheet of cellulose ester, securing fabric tabs to the ends of the blank, covering the blank and tabs with a sheet of cellulose ester, uniting the sheet of cellulose ester, blank and tabs by means of pressure, trimming away the cellulose ester sheet around the outline of the blank, and molding and finishing the collar.

2. The method of making a collar comprising, positioning a died-out fabric blank on a sheet of cellulose ester, securing a strip of cellulose ester along the outer edge of the blank, covering the blank and strip with a sheet of cellulose ester, uniting the cellulose ester sheets, fabric and strip by heat and pressure, trimming the cellulose ester sheets around the outline of the fabric blank, and molding and finishing the collar.

3. The method of making a collar, comprising, positioning a died-out fabric blank on a sheet of cellulose ester, securing fabric tabs to the ends of the blank, positioning a strip of cellulose ester along the outer edge of the blank, covering the blank, strip and tabs with a sheet of cellulose ester, uniting the cellulose ester sheets, blank and tabs by means of heat and pressure, trimming the cellulose ester sheets around the outline of the fabric blank, and molding and finishing the collar.

4. The method of making a collar comprising, positioning a died-out fabric blank on a sheet of cellulose ester, securing fabric tabs at the ends of the blanks with the grain of the fabric of the tabs arranged at an angle to the grain of the blank, covering the blank and tabs with a sheet of cellulose ester, uniting the sheets of cellulose ester and tabs, trimming away the cellulose ester sheets around the outline of the blank, and molding and finishing the collar.

5. The method of making a collar comprising, positioning a series of died-out reinforcing collar blanks between sheets of a cellulose ester, uniting said sheets and blanks into an integral sheet, dieing out said integral sheet so as to have the died-out portion correspond with the outline of the blanks in the sheet, and molding and finishing said died-out integral sheet blanks to make collars.

6. The method of making a collar comprising, positioning a series of died-out reinforcing collar blanks between sheets of a cellulose ester, a narrow strip of cellulose ester having been secured around the outer edge of the collar blanks, uniting said sheets, blanks and strips to form an integral sheet, dieing out said integral sheet, using the ribs formed in said integral sheet by the presence of said strips as a guide for positioning the die, and molding and finishing said died integral sheet blanks to make collars.

7. A collar comprising two layers of fabric united by, and between sheets of, a cellulose ester and extending the full width of the collar, the grain of one layer of fabric being arranged at an angle to the grain in the other layer of fabric.

8. A collar comprising a plurality of layers of fabric united by, and between sheets of, a cellulose ester and extending the full width of the collar, some of said layers acting as fabric strengthening material and extending only a short distance from the ends of the collar.

9. A collar comprising a plurality of layers of fabric united by, and between sheets of, a cellulose ester extending the full width of the collar, one layer only of said fabric extending throughout the length of the collar.

10. A collar comprising two layers of fabric united between sheets of a cellulose ester, one of said layers of fabric extending throughout the length of said collar and the other layer of fabric being positioned only near the ends of the collar, and both of said layers of fabric extending the full width of the collar.

11. A collar comprising a fabric between two sheets of a cellulose ester and a narrow strip of relatively thick cellulose ester disposed between the fabric and one sheet of cellulose ester and united thereto around the outer edge of the collar.

12. A collar comprising a body portion of relatively thin pyroxylin united to the side of a strengthening fabric and an outer edge built up with a separate strip of relatively thick pyroxylin to simulate the edge of an ordinary linen collar.

In testimony that I claim the foregoing I have hereunto set my hand.

FRANK P. WELCH.

Witnesses:
Annie L. Rossi,
Elsie M. De Pew.